(12) United States Patent
Eliaz et al.

(10) Patent No.: US 9,309,113 B2
(45) Date of Patent: Apr. 12, 2016

(54) RHENIUM NANOSTRUCTURES

(75) Inventors: Noam Eliaz, Netanya (IL); Eliezer Gileadi, Herzliya (IL); Adi Naor, Ganney Tikva (IL)

(73) Assignee: RAMOT AT TEL-AVIV UNIVERSITY LTD (IL)

(*) Notice: Subject to any disclaimer, the term of this patent is extended or adjusted under 35 U.S.C. 154(b) by 456 days.

(21) Appl. No.: 13/293,626

(22) Filed: Nov. 10, 2011

(65) Prior Publication Data

US 2012/0122657 A1 May 17, 2012

Related U.S. Application Data

(60) Provisional application No. 61/412,942, filed on Nov. 12, 2010.

(51) Int. Cl.
| | |
|---|---|
| B82Y 30/00 | (2011.01) |
| B82Y 40/00 | (2011.01) |
| B01J 35/06 | (2006.01) |
| B01J 23/36 | (2006.01) |
| B01J 37/34 | (2006.01) |
| B01J 35/00 | (2006.01) |

(52) U.S. Cl.
CPC ............... *B82Y 30/00* (2013.01); *B01J 23/36* (2013.01); *B01J 35/0013* (2013.01); *B01J 35/06* (2013.01); *B01J 37/348* (2013.01); *B82Y 40/00* (2013.01); *B01J 37/341* (2013.01)

(58) Field of Classification Search
USPC .......................................... 428/570
See application file for complete search history.

(56) References Cited

U.S. PATENT DOCUMENTS

| | | | |
|---|---|---|---|
| 7,179,561 B2 * | 2/2007 | Niu et al. ............. | 429/409 |
| 2010/0075137 A1 * | 3/2010 | Sinton et al. ......... | 428/328 |
| 2010/0216632 A1 * | 8/2010 | Adzic et al. .......... | 502/101 |

OTHER PUBLICATIONS

Tang et al., "Hydrogenation of Oleic Acid to 9-Octadecen-1-ol with Rhenium-Tin Catalyst", Journal of the American Oil Chemists' Society, vol. 70, No. 6, pp. 601-605, Jun. 1993.*
Philippe et al. ("Nanomechanics of rhenium wires: Elastic modulus, yield strength and strain hardening", Acta Materialia, vol. 57, pp. 4032-4035, Jun. 17, 2009).*
N. Eliaz, E. Gileadi, in: C.G. Vayenas, R.E. White, M.E. Gamboa-Aldeco (Eds.), Modern Aspects of Electrochemistry, vol. 42, Springer, New York, 2008, p. 191 (Chapter 4). Book cover and chapter 4 attached.
A. Naor, "Electrodeposition of rhenium-nickel alloys from aqueous solutions", Electrochimica Acta 54 (2009) 6028-6035.
A. Naor, "Electrodeposition of Alloys of Rhenium with Iron-Group Metals from Aqueous Solutions", J. Electrochem. Soc. 2010, vol. 157, Issue 7, pp. D422-D427.
A. Naor, "The AMMTIAC" Q. 5 (2010) 11-15.

(Continued)

*Primary Examiner* — Humera Sheikh
*Assistant Examiner* — Lucas Wang
(74) *Attorney, Agent, or Firm* — Cantor Colburn LLP

(57) ABSTRACT

A rhenium (Re) nanostructure is described. The rhenium nanostructure is an elongated nanostructure, such as, nanowire, nanorod, nanotube, branched nanostructure, and hollow nanostructure. The Re nanostructure may be a binary Re-metal nanotube, a binary Re-metal nanowire, and a binary Re-metal nanorod. The binary Re-metal nanostructure is a nanostructure composed of Re and at least one metal or nonmetal. The metal may be In, Sn, Sb, Pb, and/or Bi. The nanostructure is in powder or in liquid form.

2 Claims, 12 Drawing Sheets

(56) References Cited

OTHER PUBLICATIONS

Adi Naor, "Direct Experimental Support for the Catalytic Effect of Iron-Group Metals on Electrodeposition of Rhenium", Electrochem. Solid-State Lett. 2010, vol. 13, Issue 12, pp. D91-D93.

Adi Naor, "Electrodeposition of rhenium-tin nanowires", Electrochimica Acta 56 (2011) 6361-6370.

N. Eliaz, "Synthesis and characterization of nickel tungsten alloys by electrodeposition", Electrochimica Acta 50 (2005) 2893-2904.

* cited by examiner

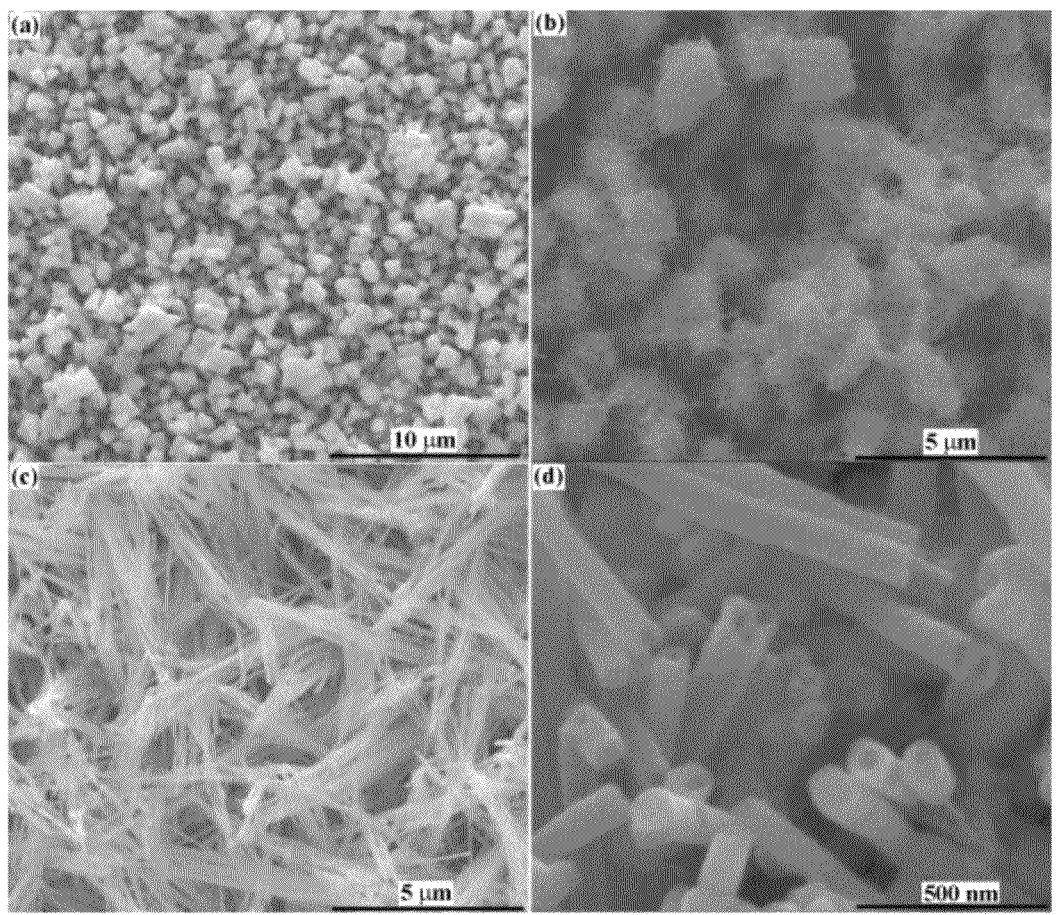
Figs. 5A-D

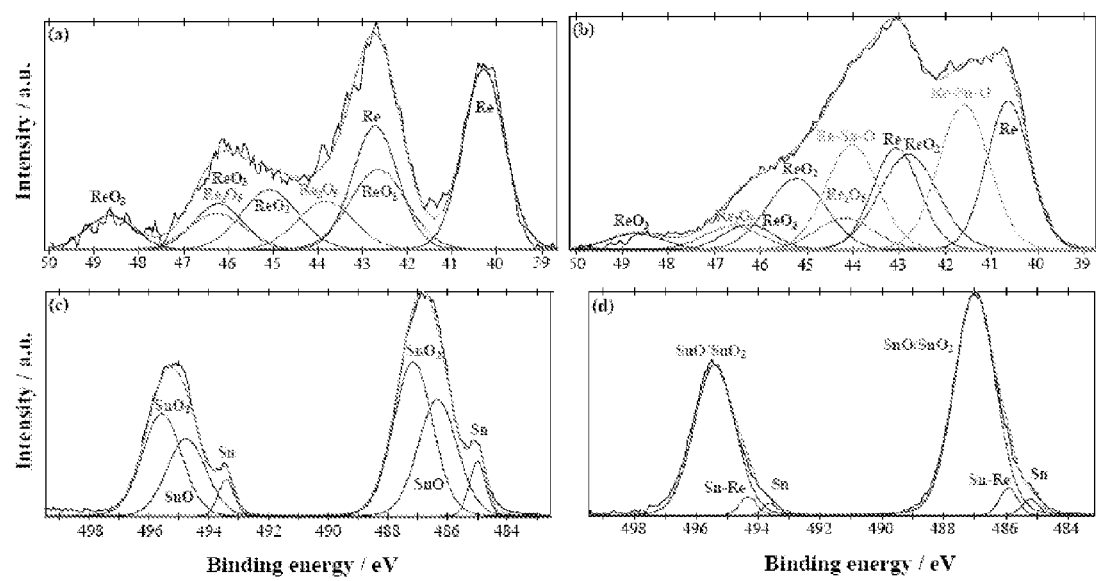
Fig. 6A-D

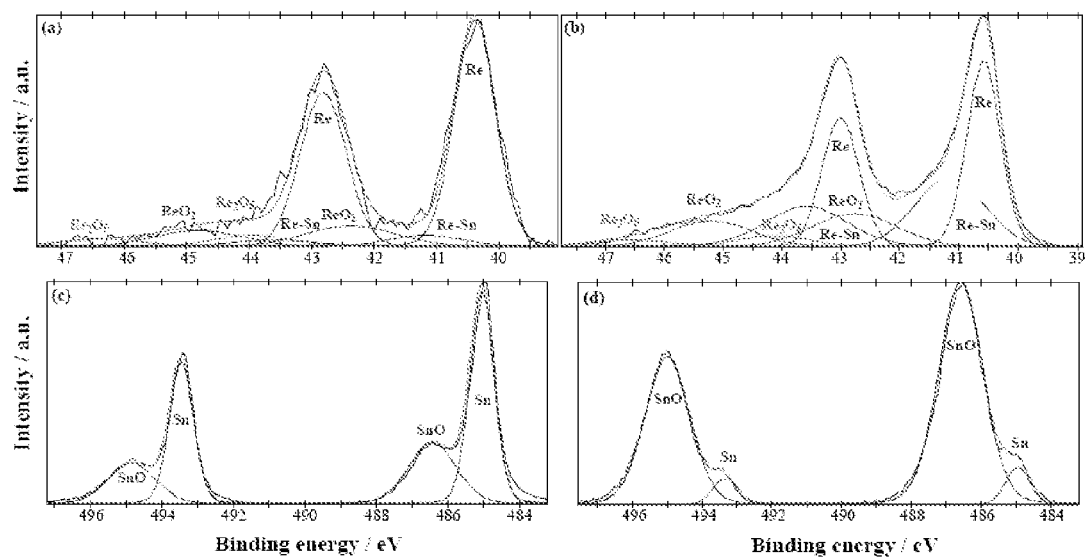
Figs. 7A-D

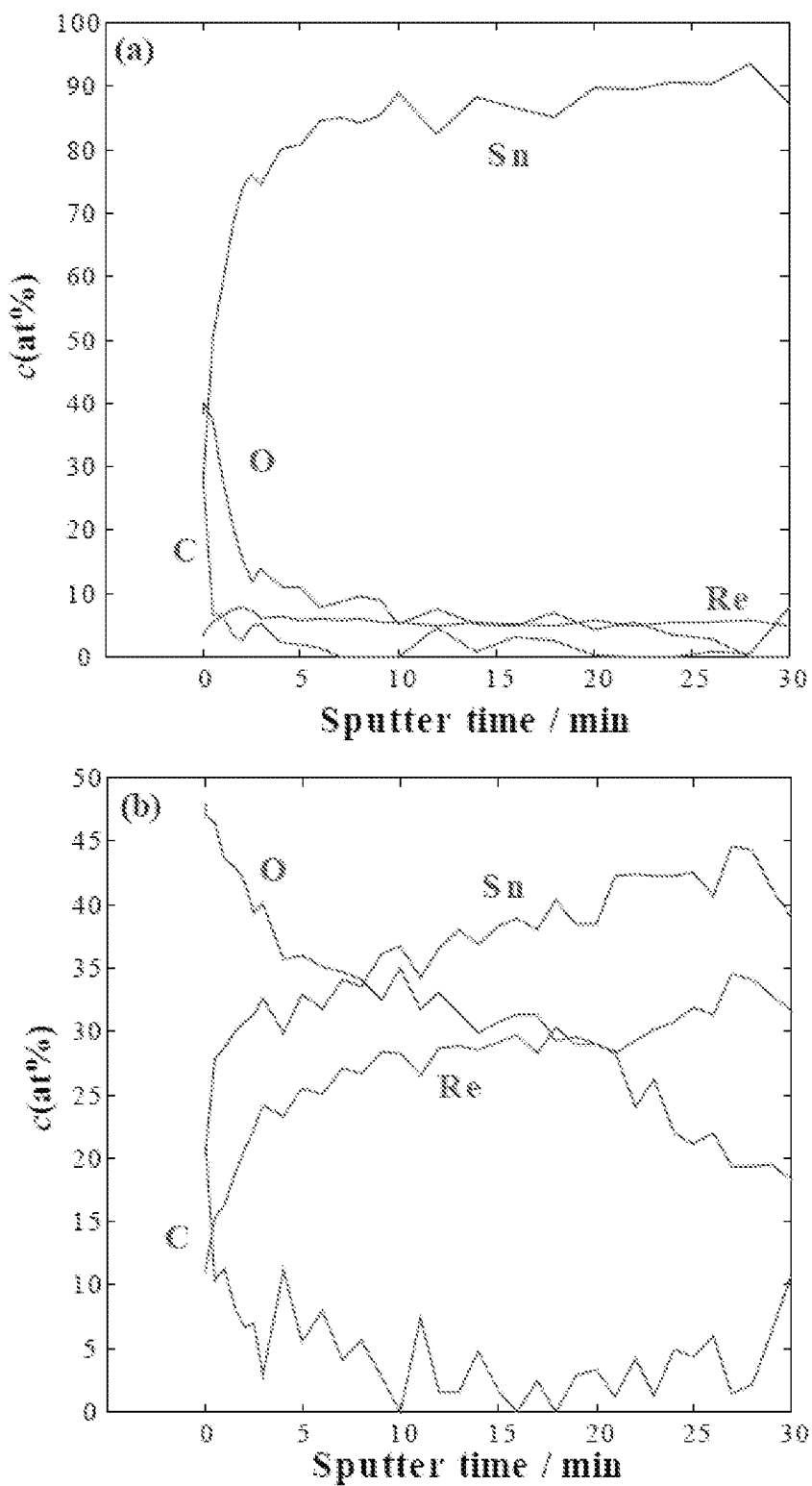
Figs. 8A-B

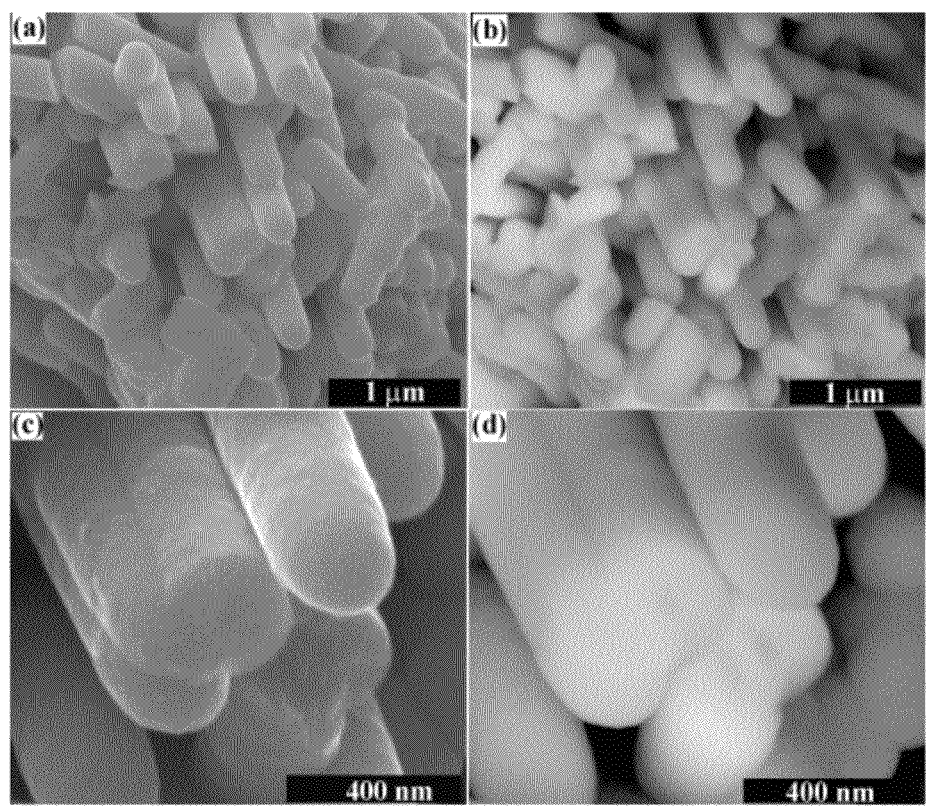
Figs. 11A-D

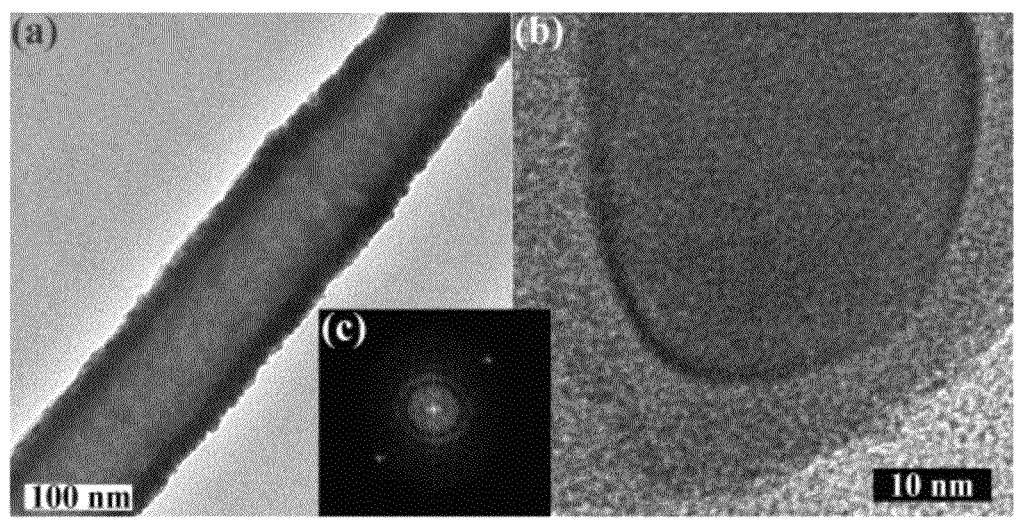
Figs. 12A-B

RHENIUM NANOSTRUCTURES

FIELD OF THE INVENTION

This invention relates to rhenium nanostructures such as nanowires and nanotubes and process for their preparation.

BACKGROUND OF THE INVENTION

Rhenium (Re) is a refractory metal, which exhibits unique combination of properties, making it an attractive material in a variety of applications such as catalysis, aerospace, electronics, nuclear, medical, fuel cells, etc. Albeit its high price, it has gained significant recognition as a high-performance engineering material.

Rhenium has the second highest melting point of all metals, the third highest Young's modulus of elasticity and the fourth highest density. It also has one of the highest strain hardening exponents of all elements, low coefficient of friction and high hardness, consequently having excellent wear properties. Compared with other refractory metals, it has superior tensile strength and creep-rupture strength over a wide temperature range (up to about 2000° C.). Its strength is comparable to that of carbon composites at 2500° C. These properties imply that structures made of Re have excellent mechanical stability and rigidity, enabling the design of parts with thin sections, and that this metal is extremely attractive for high-temperature structural and energy system applications. While the other refractory metals have a body centered cubic (bcc) structure, Re has a hexagonal close-packed (hcp) structure. Consequently, it does not possess a ductile-to-brittle transition and, therefore, can safely be used at subzero temperatures.

REFERENCES

[1] N. Eliaz, E. Gileadi, in: C. G. Vayenas, R. E. White, M. E. Gamboa-Aldeco (Eds.), Modern Aspects of Electrochemistry, vol. 42, Springer, New York, 2008, p. 191 (Chapter 4).
[2] A. Naor, N. Eliaz, E. Gileadi, Electrochim. Acta 54 (2009) 6028-6035.
[3] A. Naor, N. Eliaz and E. Gileadi, J. Electrochem. Soc. 157 (2010) D422-D427.
[4] A. Naor, N. Eliaz, E. Gileadi and S. R. Taylor, The AMMTIAC Q. 5 (2010) 11-15.
[5] A. Naor, N. Eliaz, L. Burstein and E. Gileadi, Electrochem. Solid-State Lett. 13 (2010) D91-D93.
[6] A. Naor-Pomerantz, N. Eliaz and E. Gileadi, Electrochim. Acta 56 (2011) 6361-6370.

SUMMARY OF THE INVENTION

The inventors of the present invention have demonstrated the formation and uses of rhenium (Re) nanostructures in a variety of applications.

In one aspect of the present invention, a Re nanostructure is provided. The nanostructure may be of any shape and composition. The nanostructure (i.e., individual nanostructure or in homogenous or heterogeneous populations) is typically an elongated nanostructure which may be selected amongst nanowires, nanorods, nanotubes, branched nanostructures, and hollow nanostructures of any three-dimensional arrangement.

The nanostructures of the invention are selected amongst binary Re-metal nanotubes, binary Re-metal nanowires, binary Re-metal nanorods, Re branched nanostructures (bipods, tripods, tetrapods, etc., and other asymmetrical branched structures), and hollow Re nanostructures (e.g., linear, branched or of any other shape). As used herein, the "binary Re-metal" nanostructure is a nanostructure composed of (atomic) Re and at least one metal or non-metal. In some embodiments, said metal is selected from In, Sn, Sb, Pb and Bi.

The Re nanostructures may be atomic Re (uncharged Re) nanostructures consisting atomic Re only.

In some embodiments, the nanostructures are sphere-like in shape.

The shape of the cross-section of the nanostructure can have any contour (shape). In some embodiments, the cross-section of the nanostructure has a contour (shape) of wire, rod, or tube.

Also provided are nanostructures comprising or consisting of atomic Re.

In some embodiments, the Re nanostructure has a core/shell structure with a Re core and/or a Re shell. In other embodiments, in the core/shell structure, the shell is substantially of Re and the core is substantially of at least one material, e.g., a metal being different from Re or a non-metal. In further embodiments, in the core/shell system, the shell is substantially of at least one material, e.g., a metal being different from Re or a non-metal and the core is substantially of Re.

In the core/shell nanostructure, the core diameter most often ranges from about 10 nm to about 130 nm, and the shell thickness ranges from about 5 nm to about 25 nm.

In some embodiments, the shell thickness is about 5, 6, 7, 8, 9, 10, 11, 12, 13, 14, 15, 16, 17, 18, 19, 20, 21, 22, 23, 24 or 25 nm.

In other embodiments, the shells thickness ranges from about 5 nm to 100 nm, from about 5 nm to 50 nm, from 10 nm to 50 nm, from 10 nm to 40 nm, from 10 to 30 nm, from 10 nm to 20 nm, from 5 nm to 40 nm, from 5 nm to 30 nm, from 5 nm to 20 nm or from 5 nm to 10 nm.

In some additional embodiments, the at least one metal is different from Re or a Re-based material, e.g. alloy or intermetallic compound. In further embodiments, the at least one metal is or comprises at least one soft metal, namely a metal being mechanically soft. In some embodiments, the metal is selected from In, Sn, Sb, Pb and Bi.

In some embodiments, the core is Sn and the shell is Re.

In some embodiments, the nanostructure of the invention, e.g., nanowire, is a continuous wire having a circular cross-section. In some embodiments, the cross-sectional diameter is less than 50 nm, in other embodiments less than 10 nm, and in further embodiments the diameter is between 2-10 nm, or 2-9 nm, or 2-8 nm, or 2-7 nm, or 2-6 nm, or 2-5 nm, or 2-4 nm, or 3-5 nm. In further embodiments, the cross-sectional diameter is at least 15 nm, at least 25 nm, at least 50 nm, at least 75 nm, at least 100 nm, at least 120 nm, at least 130 nm, at least 140 nm, at least 150 nm, at least 200 nm, at least 300, or at least 500 nm. In other embodiments, the cross-sectional diameter is less than 1000 nm.

The nanostructure (e.g., nanowires, nanotube) has an aspect ratio (the ratio of length of the nanowire to its diameter or width) greater than 10, in some embodiments greater than 100, in some embodiments greater than 500, and in further embodiments greater than 1000.

In some embodiments, the nanostructure of the invention (e.g., a nanorod, nanotube) has an aspect ratio of between 1.8 and 10.

The term "Re-nanostructure" referred to in this application encompasses all nanostructures disclosed or claimed herein.

The Re nanostructures of the invention comprise a substantial amount of Re, i.e., a non-impurity amount of Re. In some embodiments, the Re nanostructures is atomic Re or Re oxide (e.g., $ReO_2$, $Re_2O_5$, $ReO_3$, or $Re_2O_7$). In some embodiments, the Re nanostructures are alloys comprising Re and other metallic elements (such as defined above). The Re nanostructure contains at least 10, 20, 30, 40, 50, 60, 70, 80, or 90 atomic % Re. In some embodiments, the nanostructure is 100 atomic % Re (e.g., nanotubes disclosed further below).

The nanostructures of the invention are typically composed of at least 20 atomic % Re with the remaining being another metal. In some embodiments, the nanostructures are composed of 100 atomic % Re (nanotubes disclosed further below). In some embodiments, the nanostructure is composed of Re and Sn. In some embodiments, nanostructures of the invention are of Re—Sn, being composed of at least 10, 20, 30, 40, 50, 60, 70, 80 or 90 atomic % Re, with the remaining being Sn.

The metal/Re ratio may depend on the identity of the metal employed. In some embodiments, for Sn/Re nanowires, the ratio is between about 0.67 and 2. In some examples, the Re concentration in a metal/Re nanowires according to the invention is at least 27 atomic % for a Sn/Re ratio values of between 0.67 and 1.25. In other embodiments, the Re concentration in the nanowires is 41 atomic %.

In some embodiments, the nanostructure is composed of areas with different metal/Re ratio (or chemical composition). In some embodiments, the nanostructure is composed of a metal/Re ratio (or chemical composition) which changes along the nanostructure axis (e.g., the width axis).

In a further aspect of the invention, a nanotube of Re (having a Re-based single wall and hollow center) is provided, having substantially the same or similar dimensions as the Re nanowire disclosed herein. In the nanotube nanostructures, the walls have a thickness ranging from 5 to 100 nm.

The Re nanostructures of the invention, e.g., nanowires and nanotubes may be prepared by reacting, under suitable conditions, Re precursor and a precursor of at least one material, e.g., a metal or a non-metal. Thus, in another of its aspects, the present invention provides a method for the preparation of Re nanowires (or a different nanostructure according to the invention), as defined, said method comprises employing a suitable Re precursor and a precursor of at least one material, e.g., a metal or a non-metal, in the presence of at least one complexant in a plating bath, under conditions suitable to induce formation of Re nanostructures (the plating may be selected from electrodeposition and electroless plating).

In some embodiments, the Re precursor and, e.g., the metal precursor, in the presence of at least one complexant are contacted on a surface of a conductive substrate (the surface may be a portion of the overall conductive surface or the complete conductive surface). In some embodiments, the conductive substrate is a metallic substrate.

The surface material of the substrate may or may not be of the same material as that of the substrate. In some embodiments, a substrate, e.g., a non-conductive substrate, may be coated with a conductive coating (e.g., a thin film) on which the Re nanowires may form. The surface may be selected, for example, from copper, gold, and tin. The substrate may be glass, polymer, plastic, metallic or composite, or any other substrate which does not undergo any chemical change under the process conditions.

In further embodiments, the Re precursor is a Re salt. Non-limiting examples of the Re precursor are $NH_4ReO_4$ (ammonium perrhenate), $KReO_4$ (potassium perrhenate) and $NaReO_4$ (sodium perrhenate).

In other embodiments, where the at least one material is at least one metal, the precursor of the at least one metal is a salt of said metal. The metal precursor is typically a salt form or an acid form (such as perrhenic acid, $HReO_4$) of the metal used in the process of the invention. Where the metal is selected from In, Sn, Sb, Pb and Bi, the metal precursor is a metal salt or metal oxide of one of these metals, or an acid containing the $ReO_4^-$ anion.

Where the metal is Sn, the Sn precursor may be $SnCl_2$ (tin(II) chloride), or any other salt or oxide, or hydroxide of the metal that is soluble in the plating bath. Where the metal is In, the In precursor is selected from any salt, oxide, or hydroxide of In that is soluble in the plating bath. Where the metal is Sb, the Sb precursor is selected from any salt or oxide, or hydroxide of Sb that is soluble in the plating bath. Where the metal is Bi, the Bi precursor is selected from any salt or oxide, or hydroxide of Bi that is soluble in the plating bath. Where the metal is Pb, the Pb precursor is selected from any salt or oxide, or hydroxide of Pb that is soluble in the plating bath.

The at least one complexant employed in the process of the invention is selected amongst polyprotic acids, namely acids which are capable of donating more than one proton under the reaction conditions. The polyprotic acid may be selected amongst diprotic acids, triprotic acids, tetraprotic acids and higher homologues. The polyprotic acids are typically organic, carboxylic acids. Non-limiting examples of such polyprotic acids are adipic acid, aspartic acid, succinic acid, folic acid, fumaric acid, glutaric acid, kainic acid, oxalic acid, maleic acid, malic acid, malonic acid, pimelic acid, phthalic acid, tartaric acid, dodecanedioic acid, suberic acid, sebacic acid, citric acid, aconitic acid, isocitric acid, propane-1,2,3-tricarboxylic acid, trimesic acid, and others.

In some embodiments, the complexant is citric acid.

The process of the invention may, in further embodiments, be carried out in the presence of at least one agent capable of improving deposition of the metal, e.g., the Re. In some embodiments, the agent is a salt of a monobase such as sulfamic acid ($NH_2SO_3H$), Saccharine ($C_7H_5NO_3S$) and other additives. In other embodiments, the salt is magnesium sulfamate, tin sulfamate, etc.

The method of the invention may be carried out under conditions which permit conversion of the Re precursor into Re metal and the, e.g., metal precursor into a metal (uncharged state), and the subsequent formation of Re nanostructures. In some embodiments, the method is carried out under electrochemical (electrodeposition) conditions, either galvanostatic conditions or potentiostatic conditions, in an electrochemical cell. For the purposes of the invention disclosed herein, any electrochemical cell constructed of a working electrode on which the nanowires may form and an anode, may be used. A potentiostat or a galvanostat may be used to control either the applied potential or the applied current, respectively.

Under the galvanostatic conditions, a specified static current is set and the potential response is monitored. In some embodiments, the initial current is higher than 10 $mA \cdot cm^{-2}$. In other embodiments, the current is below 70 $mA \cdot cm^{-2}$. In other embodiments, nanowires are formed under current densities of about between 10 and 70 $mA \cdot cm^{-2}$. In still further embodiments, nanowires are formed at about 50 $mA \cdot cm^{-2}$.

Under the potentiostatic conditions, the potential on the electrode is kept constant and the current which flows through the cell is measured. In some embodiments, the potential applied is kept at −1 V or lower. In other embodiments, the potential is kept at above −1 V. In further embodiments, a potential of between −1.1 and −1.3 V vs. Ag/AgCl (saturated KCl) is employed.

In some embodiments, the methods of the invention are carried out at neutral pH or a pH which permits formation of a homogenous solution of all reaction components and of a desired electrolyte concentration. In some embodiments, the method is carried out under acidic pH, e.g., pH below 6. In some embodiments, the pH is between 4 and 6. In other embodiments, the pH of the reaction solution is 5.

In further embodiments, where the nanostructure, e.g., nanowires are of the core/shell structure, e.g., having a metal core and a Re-shell, as defined herein, the method further comprises a step of disintegrating the metal core of the metal-Re nanowire to thereby obtain a Re-nanotube.

As stated above, Re is a silvery-white metal with one of the highest melting points of all elements, exceeded by only tungsten and carbon. It is also one of the densest, exceeded only by Pt, Ir and Os. As such, certain common uses of Re are unique to this metal and are not typically applicable to other related or similar materials. In an additional aspect of the present invention, a catalyst comprised of pure Re nanostructures according to the invention is provided. Also provided is a use of a nanowire or nanotube containing both Re and another metal, as defined herein, or population thereof, as a catalyst in a great variety of catalytic reactions. Applications may arise wherever any of the following properties or a combination of them is important:
1. High wear resistance.
2. Stability at very high temperatures (say, 2200° C.).
3. Resistance to corrosion in strong acid, even in the presence of chloride environments.
4. High catalytic activity.

As stated above, the unique features of Re, render the Re nanostructure of the invention useful in a wide variety of applications. Non limiting embodiments of such applications include catalysis, aerospace components, electronic devices, components or part of components in nuclear plants, medical devices, fuel cells, etc.

In some embodiments, the Re nanostructure of the invention is usable as a catalyst, in particular, in catalysis of an organic or inorganic reaction.

In some embodiments, the Re nanostructure of the invention are integratable into fuel cells (as one of the components therein). In some embodiments, the Re nanostructure of the invention is usable as a fuel cell material.

In other embodiments, the Re nanostructure of the invention is usable as a coating material or a component of a coating material. In some embodiments, the coating is a hard coating.

In other embodiments, the Re nanostructure of the invention is usable as component in thin films, which films may be integrated in a variety of electronic or microelectronic devices.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2A dependence of the Faradaic efficiency and the Re-content in the deposit on the Sn-to-Re ratio in solution.
FIG. 2B depicts the partial deposition current densities of Re and Sn, as a function of the Sn-to-Re ratio in solution. The analytical concentrations of ammonium perrhenate and citric acid were 34 mM and 343 mM, respectively. The analytic concentration of magnesium sulfamate was equal to the analytical concentration of tin chloride in each experiment. Plating was conducted for 1 h, at 70° C., pH 5, and 50 mA·cm$^{-2}$.

FIG. 3A the dependence of the Faradaic efficiency and the Re-content in the deposit on the applied potential.
FIG. 3B the partial deposition current densities of Re and Sn, as a function of the applied potential. Citric acid 343 mM, magnesium sulfamate, tin chloride and ammonium perrhenate 34 mM each, plating time is 1 h, at 70° C., and pH 5.

FIG. 4A the dependence of the Faradaic efficiency and the Re-content in the deposit on the applied current density.
FIG. 4B the partial deposition current densities of Re and Sn, as a function of the applied current density. Citric acid 343 mM, magnesium sulfamate, tin chloride and ammonium perrhenate 34 mM each, plating time is 1 h, at 70° C., and pH 5.

FIGS. 5A-D are scanning electron microscope (SEM) secondary electron (SE) images taken from three different coatings on copper substrates.
FIG. 5A: coating obtained during step a of the process disclosed in the description,
FIG. 5B: coating obtained during step b of the process disclosed in the description,
FIG. 5C: coating obtained during step c of the process disclosed in the description, and
FIG. 5D: high-magnification image of the nanowires formed in the coating obtained during step c.

FIGS. 6A-D are high-resolution X-ray photoelectron spectroscopy (XPS) spectra, before sputtering, of coatings obtained during step a (FIGS. 6A and 6C) and step c (FIGS. 6B and 6D). The Re peaks refer to Re 4f.

FIGS. 7A-D are high-resolution XPS spectra, after sputtering, of coatings obtained during step a (FIGS. 7A and 7C) and step c (FIGS. 7B and 7D). The Re peaks refer to Re 4f.

FIGS. 8A-B depict XPS depth profiles for coatings obtained:
FIG. 8A: in step a
FIG. 8B: in step c
FIGS. 11A-D SEM images of individual nanowires formed in step c and placed on a carbon tape.
FIG. 11A SE image of the nanowires,
FIG. 11B back scattered electrons (BSE) image of the nanowires,
FIG. 11C and FIG. 11D are high-magnification SE and BSE images of the nanowires, respectively.
FIGS. 12A-B Transmission electron microscope (TEM) characterization of nanowires from coatings obtained in step c, showing the core/shell structure.
FIG. 12A low-magnification bright-field image revealing a longitudinal view of a single nanowire,
FIG. 12B high-resolution image of the cross-section of a single nanowires; the inset provided in FIG. 12A presented the fast Fourier transform (FFT) image of FIG. 12b.

DETAILED DESCRIPTION OF EMBODIMENTS

Figure 1:
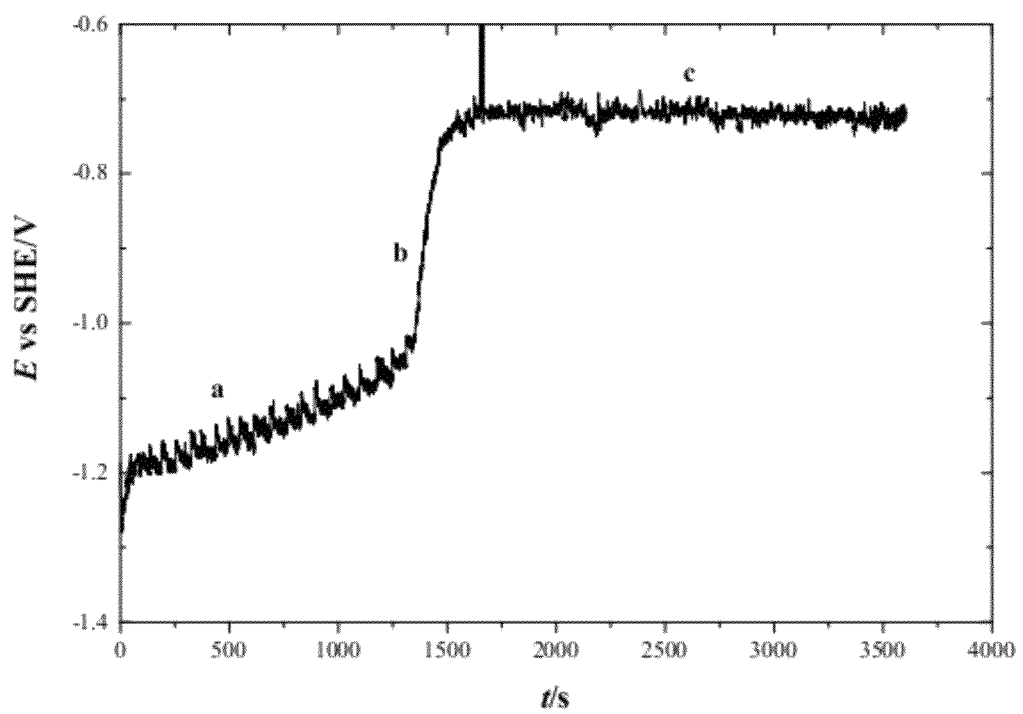
FIG. 1 depicts the dependence of potential on deposition time. Three potential steps (a-c) can be distinguished. The analytical concentration of citric acid was 343 mM, and that of magnesium sulfamate, tin chloride and ammonium perrhenate was 34 mM each. Plating was conducted for 1 h, at 70° C., pH 5, and 50 mA·cm$^{-2}$.

In the exemplary methods disclosed herein, Re nanowires were deposited in a process comprising the contacting of Re precursor and metal precursor molecules in three main steps.

In the beginning of the process, a copper substrate was immersed in the Re solution, as exemplified, and current was applied to the substrate. Once applied, a reduction in the potential was noted as microparticles of tin were formed and coated with Re. Although energy dispersive spectroscopy (EDS) analysis of the microparticles detected only Sn, the XPS analysis detected also a low concentration of Re. Since XPS is a technique which is sensitive to the surface of the sample, it may be assumed that the Re is at the surface of the Sn microparticles. After formation of the Re-coated Sn microparticles, a sharp shift of the potential in the positive direction occurred. At this stage, Re—Sn nanowires started to grow on the surface of the microparticles. With the formation of the Re—Sn nanowires, Re was detected by EDS. At the last stage of the reaction, the potential was stabilized and the nanowires grew over the whole surface of the substrate.

The formation of the nanowires occurred in sequence. For the sake of clarity, the nanowire formation sequence is referred herein in terms of the following three steps:

Step (a)—formation of faceted microparticles of Sn;

Step (b)—formation of Re—Sn nanowires on the tin microparticles; and

Step (c)—disappearance of the Sn microparticles and appearance of only a dense network of Re—Sn nanowires.

Without wishing to be bound by theory, it is believed that the microparticles of step (a) are used as reactants in step (b). The XPS measurements detect Re oxides, $ReO_3$ and $ReO_2$, the ions of which may be the products of step (a) and used as reactants in step (b) for the reduction of metallic Re.

The nanowires prepared as exemplified were limited to a Sn/Re ratio range of 0.67-2.00 under the studied experimental conditions, and the Re concentration in the deposit in this range was relatively high, approximately 27 atomic % for Sn/Re values of 0.67-1.25, and then decreased. However, the Faradaic efficiency (FE) and the partial deposition current of Sn increased with increasing concentration of Sn.

The nanowires were formed over a wide range of potential (−1.1 to −1.3 V). The FE decreased, while the Re-content and the partial deposition current density of Re increased with the increase of the overpotential. Where the overpotential is defined as the difference between the actual potential applied and the reversible potential $$\eta = E - E_{rev} \quad (1)$$

One should note the high content of Re (88 atomic %) at the highest overpotential. Moreover, the nanowires were formed also in a wide range of current densities (10-70 $mA \cdot cm^{-2}$), while the current density of 50 $mA \cdot cm^{-2}$ seemed optimal, exhibiting the maximal Re-content and partial deposition current densities of both Re and Sn, and FE of 10%.

In order to define the nature of the nanowires, several characterization techniques have been employed. In the SEM, some of the nanowires seemed like nanotubes. It should be noted that those nanotube-like structures seemed broken, with their core seemingly empty. However, as may be noted from FIG. 11, even nanowires that did not seem to be empty in the SE, appear nanotube-like in the BSE image. The atomic number of Re is 75, while that of Sn is 50. Therefore, in a BSE image Re looks brighter than Sn. This indicates that the nanowires were made of a Sn core and a Re-rich shell.

The structure of the core/shell structure for the nanowires could also be observed in the TEM images. Moreover, the EDS analysis in the TEM confirmed that the concentration of the Re was higher in the shell. Another finding that may support the existence of a Sn core was the TEM image of the edge of the nanowire, with another material attached to it. EDS analysis detected a high concentration of Sn in this material. Also, the material surface grew during the TEM imaging; this may be due to the low melting point of the material, which was reasonable in view of the low melting point of Sn (231.9° C.). The source of this Sn could have been the core of the nanowire.

The plausible structure of the nanowires is consistent with earlier understanding regarding electrodeposition of Re—Ni alloys, namely that the mechanism of Re deposition involves a unique type of electroless plating, in which the reducing agent is metallic Ni formed in situ [2]. In the case of Re—Sn electrodeposition, the formation of a Re shell may result from an oxidation of the metallic Sn nanowire formed in situ.

To summarize, conditions for the electrodeposition of Re—Sn coatings consisting of nanowires, with as high as 77 atomic % Re or FE as high as 46%, were identified. The nanowires were formed over a wide range of Sn-to-Re ratios (0.67-2.00), and in a fairly wide range of operating conditions; applied potential of −0.9 to −1.1 V and applied current density of 10-70 $mA \cdot cm^{-2}$.

As the Sn concentration in the bath was increased, the FE and the partial deposition current of Sn increased, while the Re-content in the deposit was maximal in the range of Sn-to-Re=0.67-1.25, and then decreased. However, the partial deposition current of Re increased until a Sn-to-Re ratio of 0.67, and then remained nearly constant.

As the applied potential was increased, the Re-content and the partial deposition current density of Re increased, while the FE decreased.

The optimal applied current density was 50 $mA \cdot cm^{-2}$, yielding the highest concentration of Re in the deposit and the highest partial deposition current densities of both Re and Sn, at a FE of 10%.

Without wishing to be bound by theory, it is believed that the nanowires substantially consisted of a Sn-rich crystalline core and a Re-rich amorphous shell. If so, a Re nanotube can easily be produced, by melting the Sn core. Rhenium nanotube may be very useful in a variety of applications which exploit the unique properties of Re. However, the as-received nanowires may also be useful in diverse applications, due to their exclusive composition of two very different materials.

In the framework of the study leading to the present invention, 50 or so samples were coated under different bath chemistries and operating conditions and subsequently characterized.

The Nanowires Formation

The variation of potential with time, during deposition at a current density of 50 $mA \cdot cm^{-2}$, is shown in FIG. 1. Three potential regions (steps) can be distinguished: (a) initially, the measured potential changes slowly in the positive direction (approximately, from −1.3 V to −1.1 V vs. SHE; (b) next, a sudden sharp change of the potential occurs, and (c) the potential becomes stable around a less negative value (about −0.7 V vs. SHE). It should be noted that the time at which the sudden transition from step (a) to (b) varied between repeated experiments, but it was observed in all experiments where nanowires were formed. Such behavior indicates that step (a) may represent a thermodynamically unstable state. This may be associated with the need to reduce the $ReO_4^-$ ion to a lower oxidation state, such as $ReO_3^-$, the formation of a thin layer of Sn that can act as a catalyst in the reduction of the $ReO_4^-$ ion, or the increase of the surface area associated with the initiation of formation of nanotubes or nanowires. The coatings obtained in step (a) consisted of microparticles of Sn. The color of the solution at the beginning of the experiment was light blue. However, after passing step (b) associated with the formation of the nanowires, the solution became colorless.

The coatings formed in step (c) consisted of nanowires and contained about 25 atomic % Re, 75 atomic % Sn, based on SEM-EDS measurements.

The Effect of Bath Chemistry

Figure 2A:
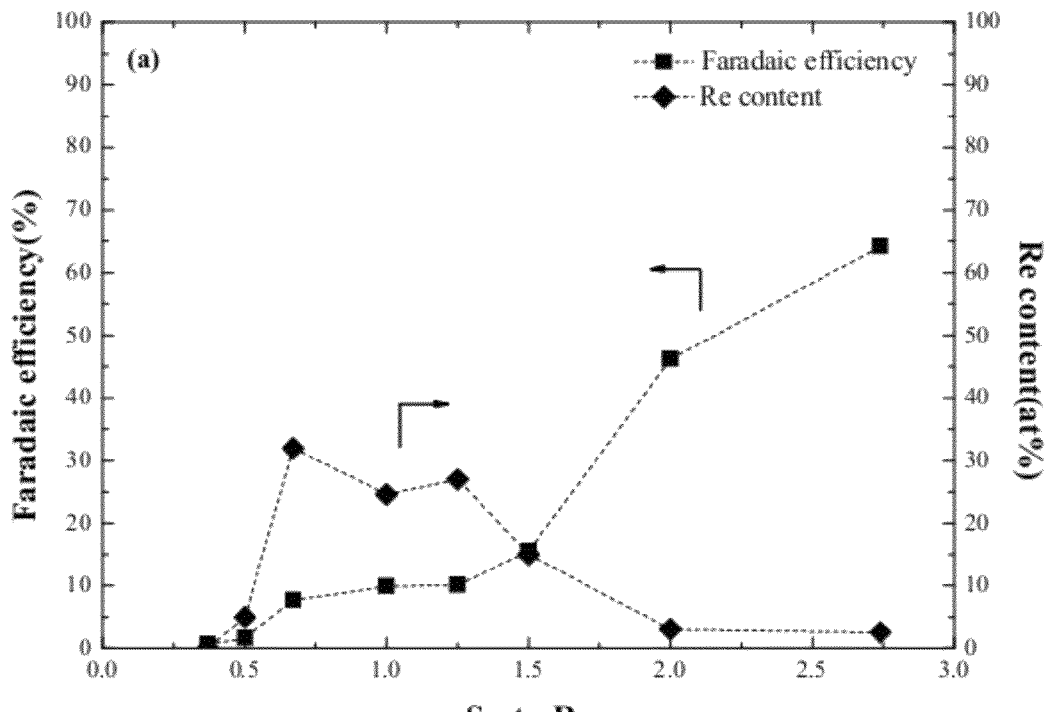
FIGS. 2A-2B depict.
Figure 2B:
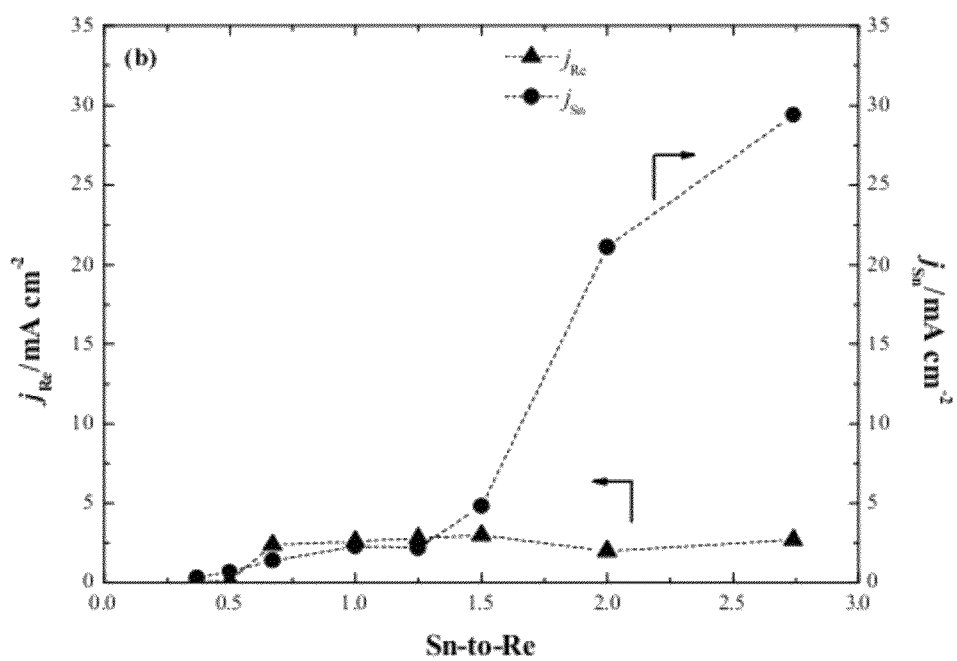

The effect of the analytical concentration of $Sn^{2+}$ ions was examined. FIG. 2A shows the effect of the Sn-to-Re ratio on the FE and Re-content in the deposited film. The dependence of the partial deposition current densities of Re and Sn on the Sn-to-Re ratio in solution is shown in FIG. 2B. In both cases, the concentrations of ammonium perrhenate and citric acid in the bath were 34 mM and 343 mM, respectively, and the analytical concentration of magnesium sulfamate was equal to the analytical concentration of tin chloride in each experiment. It should be noted that nanowires were formed at any Sn-to-Re ratio of 0.67 to 2.00. In FIG. 2A, one should note the relatively high FE (46%) when Re—Sn nanowires were formed at a Sn-to-Re ratio of 2.00.

It may also be noticed in FIG. 2A that the Re-content in the deposit is highest within the range where nanowires were formed (except for Sn-to-Re ratio of 2.00), while the partial deposition current of Re seems to be essentially independent of the concentration of $Sn^{2+}$ above a ratio of 0.50 (FIG. 2B). However, the FE is increasing significantly with increasing concentration of Sn, above a Sn:Re ratio of 1.50, and the partial deposition current of Sn exhibits the same behavior.

The Effect of Operating Conditions

1. The Effect of Potential

Figure 3A:
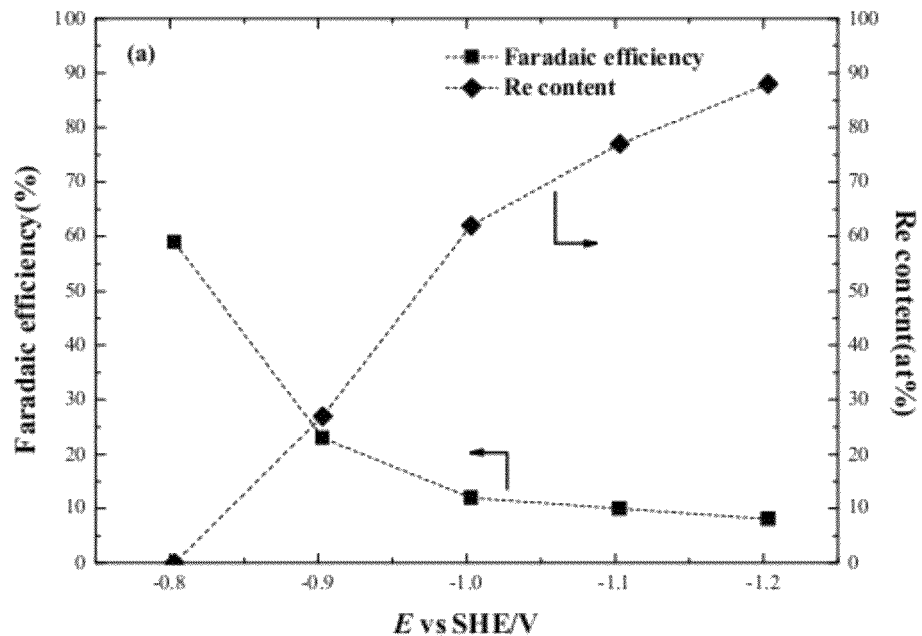
FIGS. 3A-3B depict.
Figure 3B:
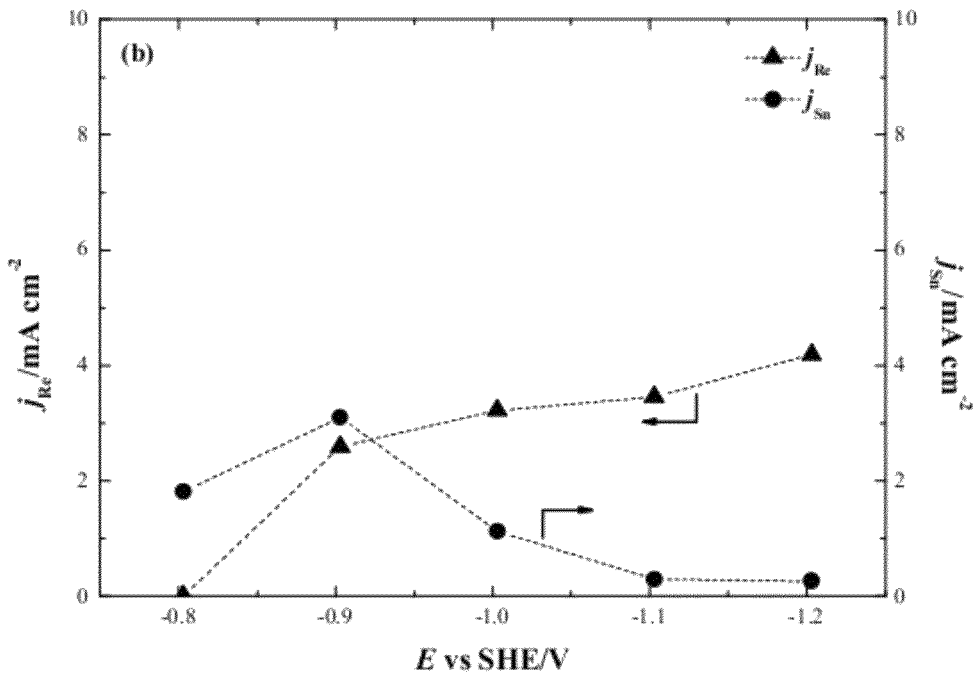

Several potentiostatic experiments were conducted, at different potentials. FIG. 3A shows the effect of the applied potential on the FE and Re-content, in a solution with a Sn-to-Re ratio of 1.00. The dependence of the partial deposition current densities of Re and Sn on the potential are shown in FIG. 3B. It should be noted that nanowires were formed within the range of −0.9 to −1.1 V vs. SHE. The FE decreased as the applied potential became more negative, while the Re-content and the partial deposition current density of Re increased. In contrast, the partial deposition current density of Sn exhibited a local maximum at −0.9 V vs. SHE. In FIG. 3A, one should note the very high Re-content (88 at. %) that was attained at the highest overpotential; however, nanowires were not formed at this applied potential.

2. The Effect of Current Density

Figure 4A:
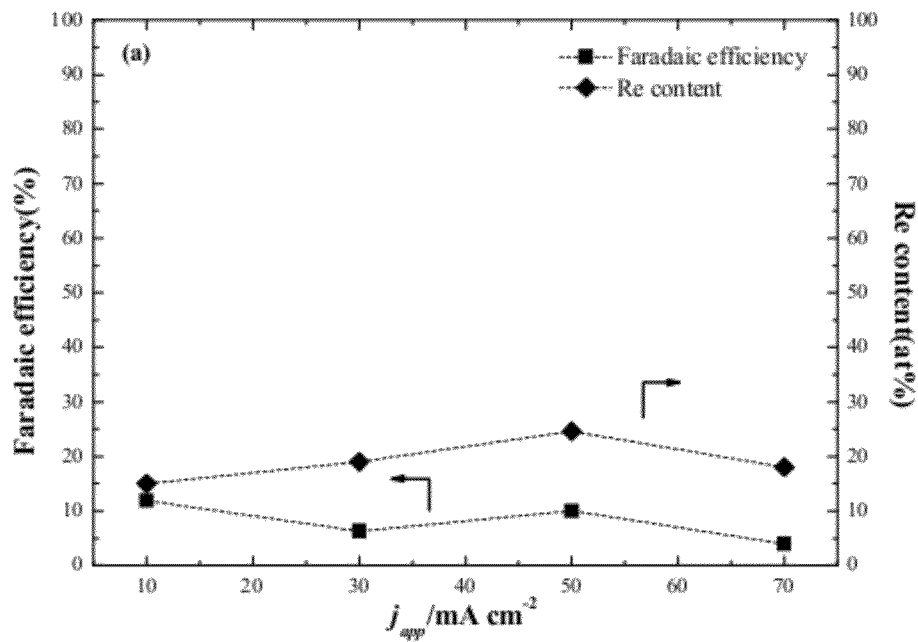
FIGS. 4A-4B depict.
Figure 4B:
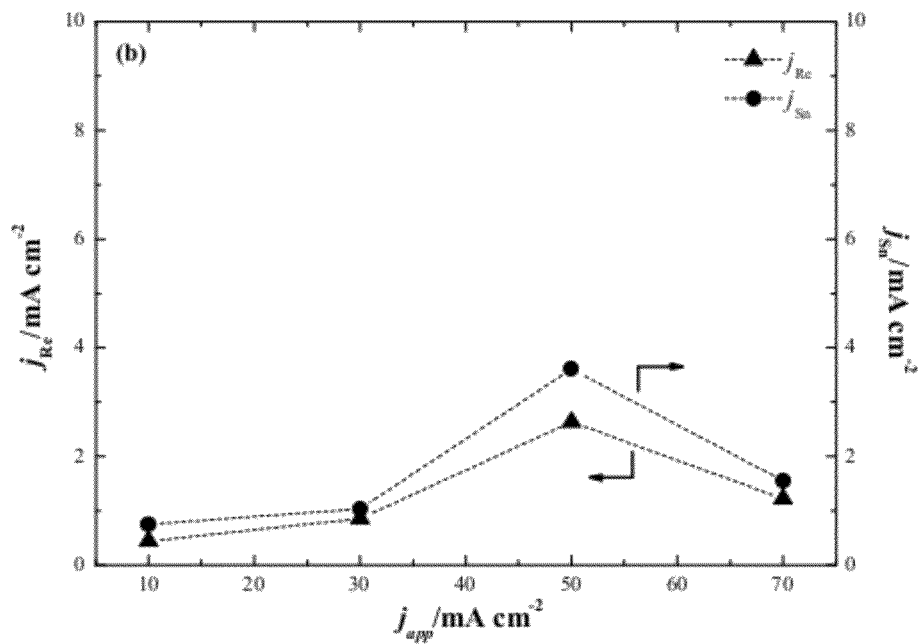

Several galvanostatic experiments were conducted at different current densities. FIG. 4A shows the effect of the current density on the FE and Re content. The dependence of the partial deposition current densities of Re and Sn on the applied current density is shown in FIG. 4B. Nanowires were formed within the whole range of current densities evaluated in this work (10-70 mA·$cm^{-2}$).

Coating Characterization

1. Surface Characterization and Thickness Measurement

Above, three steps of potential were mentioned. The coating formed during each step was characterized by SEM in order to determine its surface morphology. The images of the coatings obtained in steps (a), (b) and (c) are presented in FIGS. 5A, 5B and 5C, respectively. In step (a), faceted microparticles of Sn were formed, and only Sn was detected by EDS. In step (b), the formation of nanowires on the surface of the microparticles took place, and the EDS detected Re, in addition to Sn. Finally, at the end of step (c) the microparticles could no longer be identified by SEM, and a dense network of nanowires was observed on the surface of the sample. A high-magnification image of a zone in FIG. 5C is shown in FIG. 5D. Some of the nanowires actually seem to be nanotubes.

The surface composition was examined by XPS. A comparison was made between a coating formed in step (a), and that after the sharp change in potential, in step (c). The two sample surfaces were analyzed at different take-off angles, and the results are summarized in Tables 1 and 2. On the surface of both samples, O, C, Sn and Re were found. However, the coating formed in step (c) contained much more Re than that in step (a). It should be emphasized that Re was detected in both samples, whereas the EDS analysis detected Re only in the coatings formed during steps (b) and (c), but not during step (a). High-resolution XPS measurements for each element before sputtering are presented in FIGS. 6A-D, and after sputtering in FIGS. 7A-D. In FIGS. 6A and 6B it can be seen that metallic Re and different Re oxides are present in the two samples. However, in the sample formed within step (c) (FIG. 6B), Re—Sn alloy is present, probably in its oxidized state. Tin was found in the two samples in its metallic form, as well as in its oxidized state (FIGS. 6C and 6D). After sputtering, more metallic Re was found, and the Re—Sn alloy was found also in the sample formed in step (a), albeit in very small quantities. The different states of Re, their quantities and the peak positions, before and after sputtering, are summarized in Tables 3 and 4, respectively.

TABLE 1

Atomic concentration of elements at the surface of a coating obtained in step a (cf. FIG. 1), as acquired by XPS at different take-off angles.

|  | c/at. % 20° | c/at. % 45° | c/at. % 75° |
|---|---|---|---|
| C | 30.4 | 31.4 | 29.8 |
| O | 43.0 | 42.8 | 42.5 |
| Sn | 23.4 | 23.0 | 25.1 |
| Re | 2.7 | 2.5 | 2.6 |
| Sn:Re | 8.9:1 | 9.1:1 | 9.6:1 |

TABLE 2

Atomic concentration of elements at the surface of a coating obtained in step c (cf. FIG. 1), as acquired by XPS at different take-off angles.

|  | c/at. % 20° | c/at. % 45° | c/at. % 75° |
|---|---|---|---|
| C | 23.3 | 23.7 | 22.6 |
| O | 50.1 | 51.0 | 49.4 |
| Sn | 16.8 | 16.0 | 18.4 |
| Re | 9.9 | 9.4 | 9.6 |
| Sn:Re | 1.7:1 | 1.7:1 | 1.9:1 |

TABLE 3

Peak positions and relative abundance (% out of atomic % of rhenium presented in Tables 1 and 2) of oxidation states of rhenium at the surface of coatings obtained in steps a and c, respectively, as acquired by XPS before sputtering.

| Component | | Peak position (eV) | | % | |
|---|---|---|---|---|---|
| | | Region a | Region c | Region a | Region c |
| Re | $4f_{7/2}$ | 40.44 | 40.64 | 44.0 | 28.3 |
|  | $4f_{5/2}$ | 42.87 | 43.07 | | |
| Re—Sn—O | $4f_{7/2}$ | — | 41.60 | — | 32.6 |
|  | $4f_{5/2}$ | — | 44.03 | | |
| $ReO_2$ | $4f_{7/2}$ | 42.80 | 42.80 | 26.7 | 24.9 |
|  | $4f_{5/2}$ | 45.23 | 45.23 | | |
| $Re_2O_5$ | $4f_{7/2}$ | 43.98 | 44.18 | 16.1 | 8.4 |
|  | $4f_{5/2}$ | 46.41 | 46.61 | | |
| $ReO_3$ | $4f_{7/2}$ | 46.37 | 46.27 | 13.2 | 5.8 |
|  | $4f_{5/2}$ | 48.80 | 48.70 | | |

TABLE 4

Peak positions and relative abundance (% out of atomic % of rhenium presented in Tables 1 and 2) of oxidation states of rhenium at the surface of coatings obtained in steps a and c, respectively, as acquired by XPS after 2.5 min sputtering.

| Component | | Peak position (eV) | | % | |
|---|---|---|---|---|---|
| | | Region a | Region c | Region a | Region c |
| Re | $4f_{7/2}$ | 40.38 | 40.58 | 73.7 | 43.4 |
| | $4f_{5/2}$ | 42.81 | 43.01 | | |
| Re—Sn | $4f_{7/2}$ | 41.16 | 41.16 | 5.9 | 32.1 |
| | $4f_{5/2}$ | 43.59 | 43.59 | | |
| $ReO_2$ | $4f_{7/2}$ | 42.37 | 42.77 | 13.8 | 18.8 |
| | $4f_{5/2}$ | 44.80 | 45.20 | | |
| $Re_2O_5$ | $4f_{7/2}$ | 43.95 | 44.15 | 6.6 | 5.7 |
| | $4f_{5/2}$ | 46.38 | 46.58 | | |
| $ReO_3$ | $4f_{7/2}$ | — | — | — | — |
| | $4f_{5/2}$ | | | | |

Finally, sputtering was performed on both samples and the depth profile of each sample is presented in FIGS. 8A-B. The concentrations of oxygen and carbon decrease as the sputtering depth increases. However, the coating formed in region (c) seems to be more oxidized. Correspondingly, the concentrations of Re and Sn increase. The coating established in region (c) is richer in Re compared to the coating formed within region (a).

Figure 9:
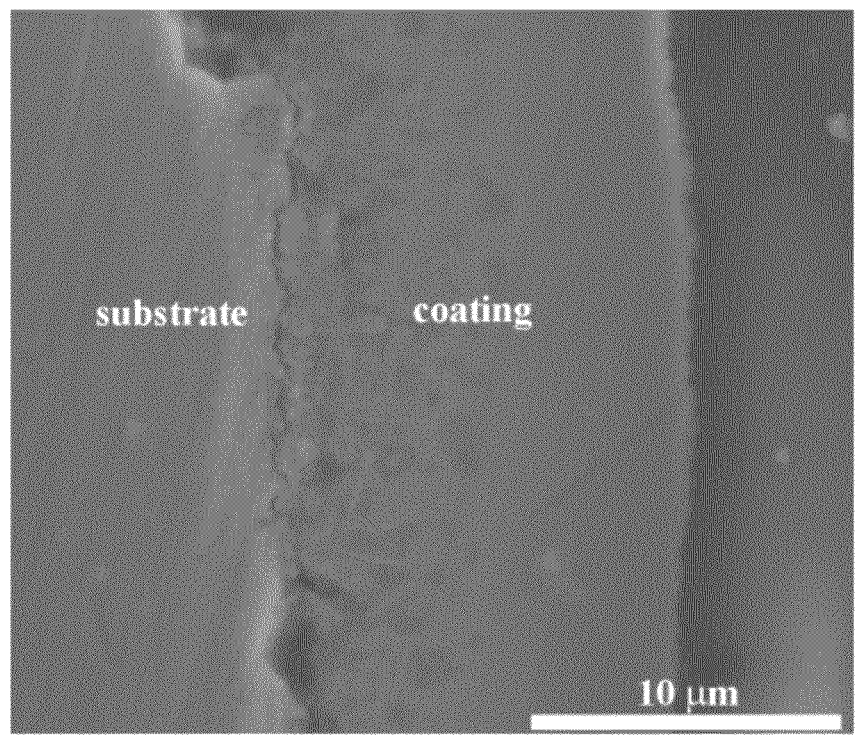
FIG. 9 is a SEM-SE image acquired from metallographic cross-section of a coating obtained in step c on a Cu substrate.

The thickness of the coating obtained in region (c), after a deposition time of 1 h, was measured by SEM on a metallographic cross-section. The image of the cross-section is presented in FIG. 9. The coating thickness is approximately 13 μm. It should be noted that the nanowires can hardly be recognized in this image, probably due to a destructive process of grinding and polishing, which might have blurred the features of the nanowires.

2. Crystallographic Structure of the Film

Figure 10:
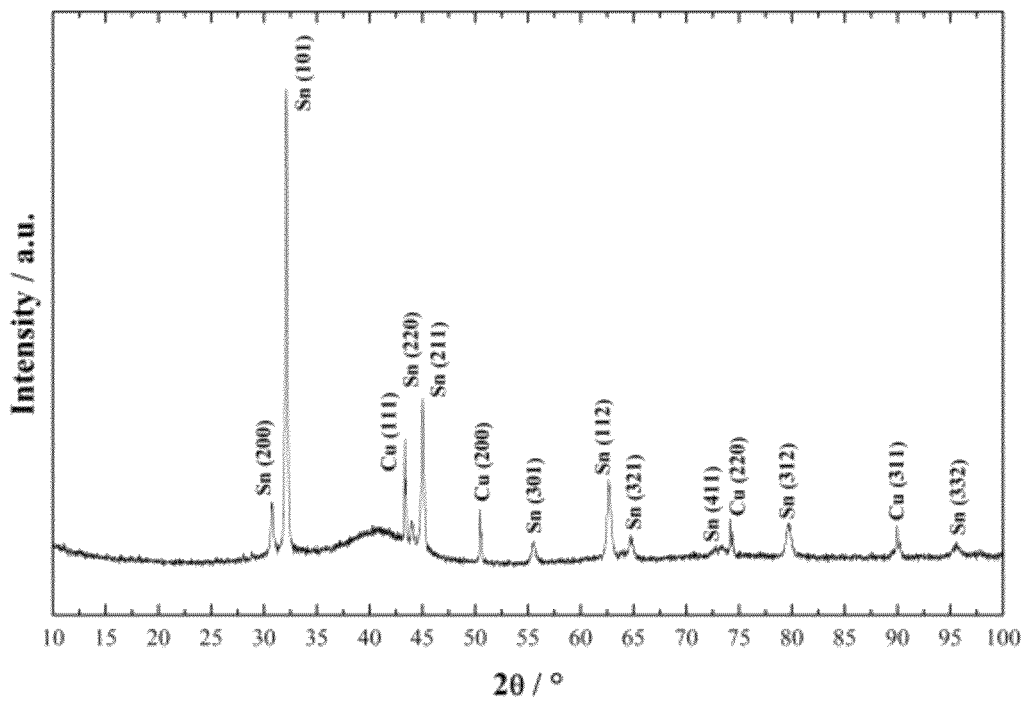
FIG. 10 X-ray diffraction (XRD) pattern from a coating consisting of nanowires.

The XRD pattern from a coating consisting of nanowires is presented in FIG. 10. This XRD pattern reveals both amorphous Re (halo at around 41°) and crystalline β-Sn with preferred orientation {101}. Sn seems to reside in a separate phase, although one cannot exclude the possibility that little Sn is present in the Re matrix. In addition, crystalline Cu, from the substrate, is detected.

Nanowire Characterization

In the SEM, two detection modes were used: secondary electrons (SE) and backscattered electrons (BSE), and the images are presented in FIGS. 11A-D. SE images (FIGS. 11A and 11C) reveal all entities as nanowires. However, BSE images (FIGS. 11B and 11D) reveal some broken nanowires to actually have a core/shell structure. EDS analysis of individual nanowires showed 60 atomic % Sn, 40 atomic % Re.

In order to better characterize individual nanowires by TEM, two sample preparation techniques were employed: (1) the coated sample was immersed in a cup containing deionized water, which was subsequently dipped in an ultrasonic bath. The nanowires were consequently broken and floated in the water, which was then poured on the TEM copper grid covered on one side with a carbon membrane. Next, the water was evaporated, and the nanowires resting on the grid were examined; (2) embedding the nanowires in glycid ether, cutting thin sections with an ultramicrotome, and placing the sample on formyar/carbon-coated TEM grids.

TEM bright-field and FFT images of individual nanowires are presented in FIGS. 12A-B. Low-magnification image along a single nanowire clearly shows the core/shell structure (FIG. 12A). According to this image, the thickness of the shell is approximately 22 nm and the diameter of the core is approximately 82 nm. High-resolution image of a cross-section of a single nanowire is presented in FIG. 12B; the core/shell structure is evident. This image shows a thickness of the shell of about 7 nm. It should be noted that the diameter of the nanowires varied in different samples (typically, within the range 40-130 nm). FIG. 12B shows lattice fringes in the core, implying a crystalline structure of the core material, most likely representing metallic Sn. In contrast, the shell exhibits an amorphous structure, which may be ascribed to amorphous Re-rich phase. FFT image of FIG. 12B is shown in the inset in FIG. 12A. Based on the analysis of this FFT image, the presence of {101} planes of crystalline Sn were determined, which was the preferred orientation found by XRD.

Experimental

Plating Bath Chemistry

Rhenium-tin alloys were electroplated from aqueous solutions containing 34 mM $NH_4ReO_4$ (ammonium perrhenate, Sigma Aldrich #316954), 12-93 mM $SnCl_2$ (tin(II) chloride, MERCK #8.18150), 12-93 mM $Mg(SO_3NH_2)_2 \cdot H_2O$ (magnesium sulfamate hydrate, Alfa Aesar #39381), and 343 mM $H_3C_6H_5O_7$ (citric acid, anhydrous, Frutarom #878591) as the complexing agent. All components were dissolved in deionized water. All of the experiments were conducted at pH 5. The pH was measured by means of InoLab pH/Oxi Level 3 meter from WTW and adjusted at room temperature to the desired value by additions of NaOH, and in some cases small amounts of $H_2SO_4$. The conductivity of the solution was above 20 mS·cm$^{-1}$. The volume of electrolyte in the cell was about 10 mL and each experiment was conducted in a fresh solution.

Magnesium sulfamate is a salt of the strong monobasic sulfamic acid ($NH_2SO_3H$). The incorporation of sulfamate in plating baths has been reported to produce better results in higher applied deposition rates, superior throwing power, as well as reduced porosity and reduced residual stresses in the deposit. Citric acid is a commonly used complexing agent. It is a tri-basic acid, which deprotonates gradually as the pH is increased. At pH 5, correcting for the activity and the temperature, the main species in solution are $H_2Cit^-$ (11.6%), $HCit^{2-}$ (67.7%) and $Cit^{3-}$ (20.7%), cf. (Naor, Eliaz, Gileadi, 2009).

Operating Conditions

In this work, a small three-electrode cell was used. A sheet of copper with an exposed area A=1.57 cm$^2$ was used as the working electrode. Two platinum sheets were used as the anodes, and were placed at about 0.5 cm away from both sides of the cathode. The diameter of the counter electrode was 20% smaller than that of the working electrode, to improve the uniformity of current distribution on the working electrode.

A Princeton Applied Research model 263A Potentiostat/Galvanostat was used to control either the applied current density at 10-70 mA·cm$^{-2}$ or the applied potential at −1.1 to −1.4 V. All measurements of potential presented were made with respect to an Ag/AgCl (saturated KCl) electrode.

The FE is calculated from the mass gained, the charge passed and the chemical composition of the deposit, as determined by EDS. For the galvanostatic experiments, the FE is calculated using the equation:

$$FE = \frac{wF}{It} \sum \frac{c_i n_i}{M_i} \times 100 \qquad (2)$$

where w is the measured mass of the deposit (g), t is the deposition time (s), I is the total current passed (A), $c_i$ is the weight fraction of the element (either Re or Sn) in the binary alloy deposit, $n_i$ is the number of electrons transferred per atoms of each metal ($n_i$=7 and 2 for Re and Sn, respectively), $M_i$ is the atomic mass of that element ($M_i$=186.2 and 118.71 g·mol$^{-1}$ for Re and Sn, respectively), and F is the Faraday's constant (96,485 C). For the potentiostatic experiments, the charge is determined based on integration of the current versus time curve.

The partial deposition current densities are calculated from the mass gained and the chemical composition of the deposit, as determined by EDS, using the equation:

$$j_i = \frac{w}{At} \times \frac{c_i n_i F}{M_i} \quad (3)$$

where $j_i$ is the partial current density of element i and A is the surface area of the cathode (cm$^2$).

The bath was purged with pure nitrogen for about 15 minutes before turning on the current. Nitrogen was passed above the solution during deposition. In all cases, the plating bath was operated at a temperature of 70±0.01° C. A Lauda Ecoline E-220T thermostatic bath was employed to control the temperature. Stirring was applied in order to maintain the homogeneity of solution and reduce pitting that may be caused by accumulation of hydrogen bubbles at the surface of the cathode. The rotating speed of the magnetic stirring bar was set at 500 rpm. The electroplating process was typically run for 1 h, the shortest experiment time being 20 min.

Characterization Techniques

The surface morphology of the deposits after drying was evaluated by means of an environmental SEM operated in the high-vacuum mode (Quanta 200 FEG from FEI). The attached liquid-nitrogen-cooled Oxford Si EDS detector was used to determine the atomic composition of the alloy. Each sample was analyzed at five locations, to confirm uniformity. Metallographic cross-sections of selected sample were prepared in order to characterize the coating thickness and uniformity. The thickness of the coating was measured on metallographic cross-sections by means of analySIS Docu image analysis package. The SEM-SE images for these measurements were acquired under the low-vacuum mode. Phase identification was carried out by X-ray diffraction (XRD). To this aim, a Θ-Θ powder diffractometer from Scintag, equipped with a liquid nitrogen-cooled germanium solid-state detector and Cu—K$_\alpha$ radiation source, was used. The surface of selected samples was characterized using X-ray photoelectron spectroscopy (XPS) measurements, performed under UHV (3.3×10$^{-8}$ Pa base pressure) in a 5600 Multi-Technique System (PHI, MN, USA). The samples were irradiated with an Al—K$_\alpha$ monochromated source (1486.6 eV) and the electrons emitted were analyzed by a Spherical Capacitor Analyzer using the slit aperture of 0.8 mm. The samples were analyzed at the surface at different take-off angles and during depth profiling with Ar$^+$ ion gun (2 kV, 5×5 raster, ~20 A·min$^{-1}$ sputtering rate on SiO$_2$/Si up to 20 min sputtering and 4 kV, 3×3 raster, ~43 A min$^{-1}$ sputtering rate after 20 min sputtering). The structure and the composition of the nanowires, placed onto a copper grid covered on one side with a carbon membrane, were characterized by a field-emission gun TEM (FEG-TEM), model Tecnai F20 from Philips, operating at 200 kV and equipped with an EDS detector from EDAX for chemical analysis. High-resolution imaging and FFT analysis of the nanowires were performed.

The invention claimed is:

1. A rhenium nanostructure consisting of Re, said nanostructure being selected from a Re branched nanostructure, a Re nanotube, a Re nanowire, and a hollow Re nanostructure, the Re nanowire having a cross-sectional diameter of less than 100 nm.

2. The nanostructure of claim 1, being selected from Re branched nanostructure and a hollow Re nanostructure, said nanostructure consisting of atomic Re.

\* \* \* \* \*